US012764026B2

(12) United States Patent
Kuravangi-Thammaiah et al.

(10) Patent No.: US 12,764,026 B2
(45) **Date of Patent: *Oct. 13, 2026**

(54) SYSTEMS AND METHODS FOR NETWORK FUNCTION DISCOVERY IN A SEGMENTED NETWORK

(71) Applicant: Verizon Patent and Licensing Inc., Basking Ridge, NJ (US)

(72) Inventors: Shanthala Kuravangi-Thammaiah, Keller, TX (US); Emerando M. Delos Reyes, Pleasant Hill, CA (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 80 days.

This patent is subject to a terminal disclaimer.

(21) Appl. No.: 19/019,637

(22) Filed: Jan. 14, 2025

(65) Prior Publication Data

US 2025/0158891 A1 May 15, 2025

Related U.S. Application Data

(63) Continuation of application No. 18/186,428, filed on Mar. 20, 2023, now Pat. No. 12,224,913.

(51) Int. Cl.
*H04L 41/122* (2022.01)

(52) U.S. Cl.
CPC .................................. *H04L 41/122* (2022.05)

(58) Field of Classification Search
CPC ..................................................... H04L 41/122
See application file for complete search history.

(56) References Cited

U.S. PATENT DOCUMENTS

2020/0036754 A1 1/2020 Livanos
2023/0032054 A1 2/2023 Jayaramachar
2023/0042219 A1 2/2023 Singh
(Continued)

FOREIGN PATENT DOCUMENTS

WO 2023/233259 12/2023

OTHER PUBLICATIONS

"3rd Generation Partnership Project; Technical Specification Group Core Network and Terminals; 5G System; Network Function Repository Services; Stage 3 (Release 17)", 3GPP TS 29.510 V17.3.0 (Sep. 2021), pp. 1-271.

(Continued)

*Primary Examiner* — Tonia L Dollinger
*Assistant Examiner* — Joseph M Cousins

(57) ABSTRACT

A method may include subscribing, by a first network repository function (NRF) located in a first segment of a network, to event information associated with a unified data management (UDM) function or a unified data repository (UDR) located in a second segment of the network. The method may also include receiving, by the first NRF and from a second NRF included in the second segment UDM or UDR information associated with the UDM or UDR located in the second segment of the network. The method may further include receiving, at the first NRF, a UDM or UDR discovery request from a network function (NF), wherein the UDM or UDR discovery request is associated with subscriber information stored in a UDM or UDR located in the second segment of the network, and responding, by the first NRF, to the discovery request.

20 Claims, 7 Drawing Sheets

(56) References Cited

U.S. PATENT DOCUMENTS

| | | | |
|---|---|---|---|
| 2023/0110286 | A1 | 4/2023 | Jayaramachar |
| 2023/0188963 | A1 | 6/2023 | Sapra |

OTHER PUBLICATIONS

"Network function repository services; Stage 3, (3GPP TS 29.510 version 16.5.0 Release 16)", ETSI, 5G; 5G System, Nov. 2020, p. 1-210 (Year: 2020).

SYSTEMS AND METHODS FOR NETWORK FUNCTION DISCOVERY IN A SEGMENTED NETWORK

RELATED APPLICATION

This patent application is a Continuation of U.S. application Ser. No. 18/186,428 filed on Mar. 20, 2023, titled "Systems and Methods for Network Function Discovery in a Segmented Network," the disclosure of which is hereby incorporated by reference herein in its entirety.

BACKGROUND INFORMATION

In conventional Fifth Generation (5G) network environments, each network function (NF) registers with a Network Repository Function (NRF). In a segmented 5G network, a number of NFs, including the NRF, may include a number of separate devices or functions deployed throughout different segments of the network. Such segmentation of the network may reduce the risk and/or severity of network attacks. In segmented networks, each NF in a segment of the network may register with an NRF located in the same network segment. However, due to the segmentation, discovering particular NFs located in different segments and/or information associated with the NFs located in different network segments may lead to increases in latency and increases in the number of inter-segment transactions per second (TPS).

DETAILED DESCRIPTION OF EXAMPLE EMBODIMENTS

The following detailed description refers to the accompanying drawings. The same reference numbers in different drawings may identify the same or similar elements.

Implementations described herein provide a segmented network in which NFS, including a Network Repository Function (NRF), are deployed in segments throughout the network. In such implementations, the NRF in each segment may subscribe to information received by NRFs in other segments, such as registration and status information associated with particular NFs located in the other segments. For example, an NRF located in one network segment may subscribe to registration and status information associated with a Unified Data Management (UDM) function and a Unified Data Repository (UDR) function located in the other network segment. The subscribing NRF in each segment may then receive registration and status information regarding the particular UDM and/or UDR located in the other network segment. The subscribing NRF may also propagate the registration and/or status information associated with the UDM and/or UDR by similarly notifying neighboring NRFs that also subscribe to the UDM/UDR information.

In this manner, each NRF in the segmented network will be synchronized with the other NRFs with respect to the subscribed information. For example, each NRF may include current information regarding UDMs and UDRs located in each segment of the network. As a result, when an NF attempts to discover subscriber profile information regarding a particular subscriber that is stored in a UDM and/or UDR that is located in another network segment, the NRF that receives the discovery request will be able to provide the cross-segment UDM/UDR information without having to forward a discovery request to another NRF. This will allow the network to reduce latency associated with cross-segment requests, as well as reduce the number of cross-segment communications.

Figure 1:
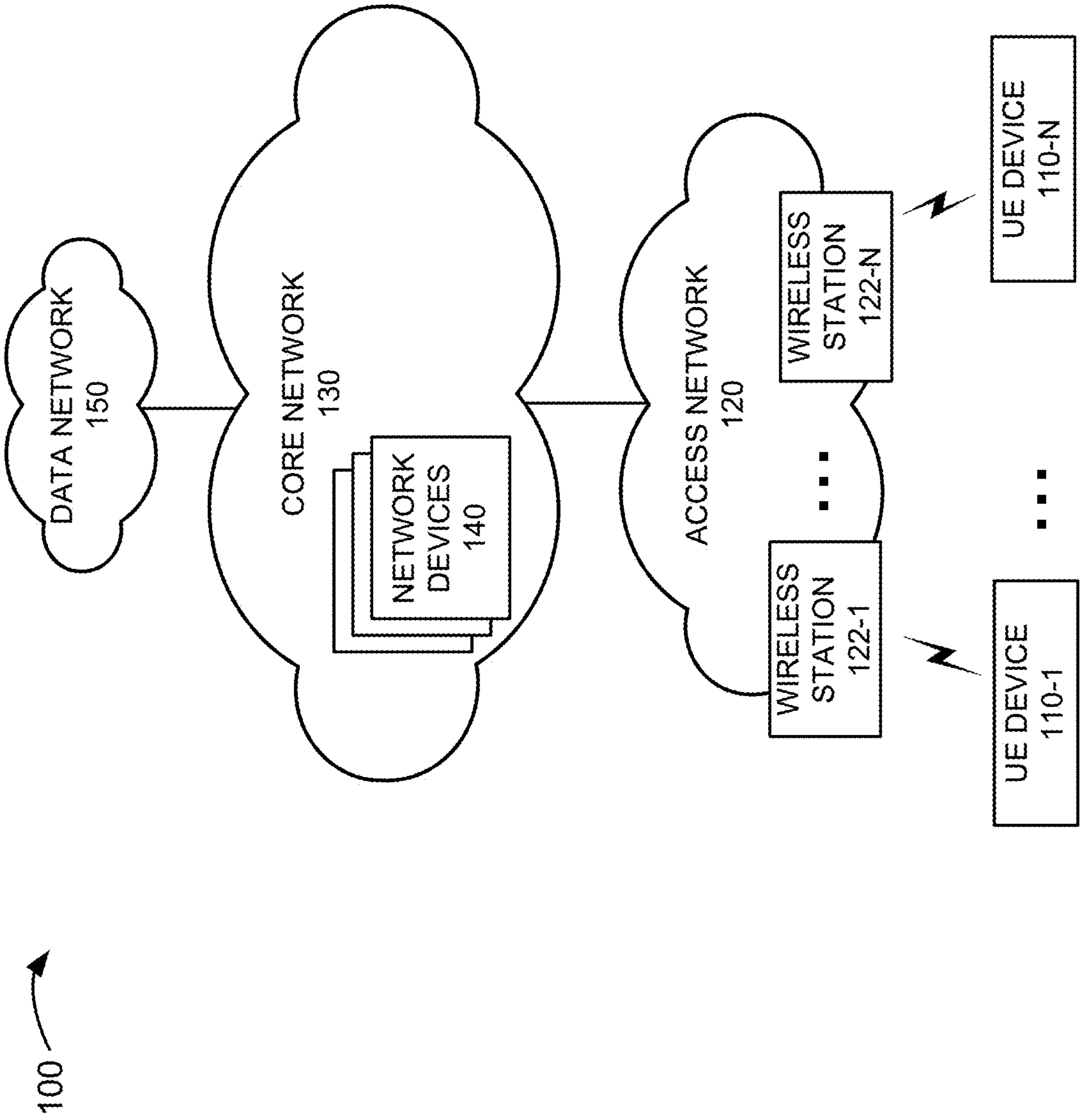
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes user equipment (UE) devices 110-1 through 110-N, access network 120, wireless stations 122-1 through 122-N, core network 130, network devices 140 and data network 150.

UE devices 110-1 and 110-N (referred to herein individually as UE device or UE 110, and collectively as UE devices or UEs 110) may include any computing device, such as a personal computer (PC), a laptop computer, a server, a tablet computer, a notebook, a Chromebook®, a mobile device such as wireless or cellular telephone device (e.g., a conventional cell phone with data processing capabilities), a smart phone, a personal digital assistant (PDA) that can include a radiotelephone, any type of mobile computer device or system, a game playing device, a music playing device, a home appliance device, a home monitoring device, a virtualized system, an Internet of Things (IoT) device, a machine type communication (MTC) device, etc., that includes communication functionality. UE device 110-1 may connect to access network 120 via wireless station 122-1 and UE device 110-N may connect to access network 120 via wireless station 122-N. UE devices 110 may also connect to other devices in environment 100 via other techniques, such as wired, wireless, optical connections or a combination of these techniques. UE device 110 and a person that may be associated with UE device 110 (e.g., the party holding or using UE device 110) may be referred to collectively as UE device 110 or UE 110 in the description below.

Access network 120 may provide access to core network 130 for wireless devices, such as UE devices 110. Access network 120 may enable UE device 110 to connect to core network 130 for Internet access, non-Internet Protocol (IP) data delivery, cloud computing, mobile telephone service, Short Message Service (SMS) message service, Multimedia Message Service (MMS) message service, and/or other types of data services. Access network 120 may provide access to core network 130, a service or application layer network, a cloud network, a multi-access edge computing (MEC) network, a fog network, etc. Furthermore, access network 120 may enable a device in core network 130 to exchange data with UE device 110 using a non-IP data delivery method such as Data over Non-Access Stratum (DoNAS).

Access network 120 may also include a Fifth Generation (5G) access network or another advanced network, such as a Fourth Generation (4G) Long Term Evolution (LTE) access network. For example, access network 120 may include the functionality of a 5G network, such as 5G Radio Access Network (RAN) communicating via mmWave technology, a 5G RAN communicating via C-band technology or other types of 5G networks. Access network 120 may also include a 4G RAN.

Access network 120 may also include: support for advanced or massive multiple-input and multiple-output (MIMO) antenna configurations (e.g., an 8×8 antenna configuration, a 16×16 antenna configuration, a 256×256 antenna configuration, etc.); support for cooperative MIMO (CO-MIMO) configurations; support for carrier aggregation; relay stations; Heterogeneous Networks (HetNets) of overlapping small cells and macrocells; Self-Organizing Network (SON) functionality; machine type communication (MTC) functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality.

Wireless stations 122 (referred to collectively as wireless stations 122 and individually as wireless station 122) may be included in access network 120. Each wireless station 122 may service a number of UE devices 110 and/or other user devices when the particular device is within radio frequency range of wireless station 122. In one implementation, wireless station 122 may include 5G base station (e.g., a next generation NodeB (gNB)) that includes one or more radio frequency (RF) transceivers. For example, wireless station 122 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams. In other implementations, wireless station 122 may also include a 4G base station (e.g., an evolved NodeB (eNodeB)) or a 6G base station that communicates wirelessly with UEs 110 located within the radio frequency range of wireless station 122.

Core network 130 may include one or more wired, wireless and/or optical networks that are capable of receiving and transmitting data, voice and/or video signals. In an exemplary implementation, core network 130 may be associated with a telecommunications service provider (e.g., a service provider providing cellular wireless communication services and wired communication services) and may manage communication sessions of UE devices 110 connecting to core network 130 via access network 120. Core network 130 may include one or multiple networks of different types and technologies. For example, core network 130 may be implemented to include a next generation core (NGC) network for a 5G network, an Evolved Packet Core (EPC) of an LTE or LTE Advanced network, a sixth generation (6G) network, and/or a legacy core network. Core network 130 may provide packet-switched services and wireless IP connectivity to various components in environment 100, such as UE devices 110, to provide, for example, data, voice, and/or multimedia services.

Core network 130 may include various network devices 140. Depending on the implementation, network devices 140 may include 5G core network components (e.g., a User Plane Function (UPF), an Access and Mobility Management Function (AMF), a Session Management Function (SMF), a Unified Data Management (UDM) function, a Unified Data Repository (UDR), a Network Repository Function (NRF), a Policy Control Function (PCF), a Charging Function (CHF), a Network Exposure Function (NEF), an Application Function (AF), etc.), 4G core network components (e.g., a Serving Gateway (SGW), a Packet data network Gateway (PGW), a Mobility Management Entity (MME), a Home Subscriber Server (HSS), a Policy Charging and Rules Function (PCRF) etc.), or another type of core network components (e.g., future 6G network components). In other implementation, network devices 140 may include combined 4G and 5G functionality, such as a session management function with PGW-control plane (SMF+PGW-C) and a user plane function with PGW-user plane (UPF+PGW-U).

In accordance with an exemplary implementation, core network 130 may be segmented to include a number of different segments that each include various NFs, as described in detail below. The term "segmented network" as used herein should be broadly construed to include a network that includes multiple portions that may include at least some of the same or similar elements/NFs deployed in each portion of the network.

Data network 150 may include, for example, a packet data network. In an exemplary implementation, UE device 110 may connect to data network 150 via core network 130. Data network 150 may also include and/or be connected to a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks.

The exemplary configuration illustrated in FIG. 1 is provided for simplicity. It should be understood that a typical environment may include more or fewer devices than illustrated in FIG. 1. For example, environment 100 may include a large number (e.g., thousands or more) of UE devices 110 and wireless stations 122, as well as multiple access networks 120, core networks 130 and/or segmented core networks, and data networks 150. Environment 100 may also include elements, such as gateways, monitoring devices, network elements/functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
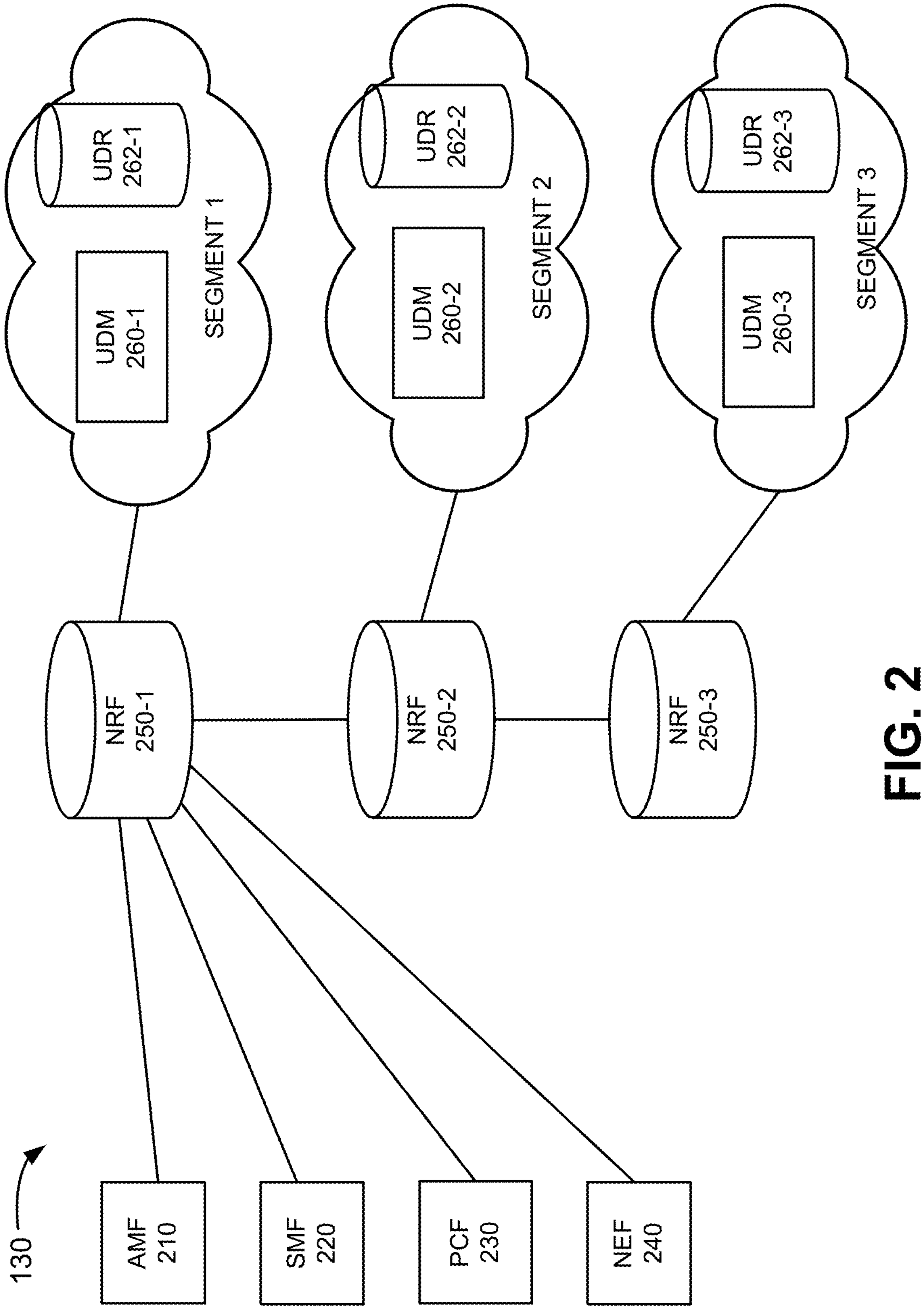
FIG. 2 is a block diagram of components implemented in the environment of FIG. 1 in accordance with an exemplary implementation.

FIG. 2 illustrates a portion of environment 100, including elements implemented in a segmented core network 130 in accordance with an exemplary implementation. Referring to FIG. 2, network devices 140 in core network 130 include AMF 210, SMF 220, PCF 230, NEF 240, NRFs 250-1 through 250-3, UDM functions 260-1 through 260-3 (also referred to collectively as UDMs 260 and/or UDMs 260-1 through 260-3, and referred to individually as UDM 260 and/or UDM 260-X, where X is any integer) and UDRs 262-1 through 262-3 (also referred to collectively as UDRs 262, and individually as UDR 262 and/or UDR 262-X, where X is any integer). It should be understood that segmented core network 130 may include other elements/functions, and/or differently arranged elements.

Segment 1 of core network 130 may include NRF 250-1, UDM 260-1 and UDR 262-1. Segment 1 may also include other NFs that are not shown in FIG. 2. Segment 2 of core network 130 may similarly include NRF 250-2, UDM 260-2 and UDR 262-3, and segment 3 may include NRF 250-3, UDM 260-3 and UDR 260-3, as well as other NFs (not shown).

AMF 210 may perform registration management, connection management, reachability management, mobility management, lawful intercepts, SMS transport between UE device 110 and other network functions, session management messages transport between UE device 110 and other network functions, such as SMF 220, access authentication and authorization, location services management, functionality to support non-3GPP access networks, and/or other types of management processes.

SMF 220 may perform session establishment, session modification, and/or session release, perform Internet Protocol (IP) address allocation and management, perform Dynamic Host Configuration Protocol (DHCP) functions, perform selection and control of a UPF (not shown), configure traffic steering at the UPF to guide the traffic to the correct destinations, terminate interfaces toward a PCF (e.g., PCF 230), perform lawful intercepts, charge data collection, support charging interfaces, control and coordinate charging data collection, terminate session management parts of Non-Access Stratum (NAS) messages, perform downlink data notification, manage roaming functionality, and/or perform other types of control plane processes for managing user plane data.

PCF 230 may perform policy control functions, as well as some session management functions. For example, PCF 230 may support policies to control network behavior, provide policy rules to control plane functions (e.g., to SMF 220), access subscription information relevant to policy decisions, generate policy decisions, and/or perform other types of processes associated with policy enforcement. Furthermore, PCF 230 may obtain an enterprise policy that includes a mapping between applications associated with the enterprise and quality of service (QoS) classes and may provide the enterprise policy to SMF 220 and/other elements in core network 130. In an exemplary implementation, PCF 230 may generate a policy decision regarding a UE data session based on location-related information associated with UE 110.

NEF 240 may expose capabilities and events to other network functions (NFs), including third party NFs, application functions (AFs), edge computing NFs, and/or other types of NFs. Furthermore, NEF 240 may secure provisioning of information from external applications to core network 130, translate information between core network 130 and devices/networks external to core network 130, support a Packet Flow Description (PFD) function, and/or perform other types of network exposure functions.

NRFs 250-1 through NRF 250-3 may each support a service discovery function and maintain profiles of available NF instances and their supported services. An NF profile may include, for example, an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. In accordance with an exemplary implementation, NRFs 250 may each subscribe to event information associated with, for example, UDM 260 and UDR 262 located in other network segments, as described in detail below.

Each UDM 260 may maintain subscription information for UE devices 110, manage subscriptions, generate authentication credentials, handle user identification, perform access authorization based on subscription data, perform network function registration management, maintain service and/or session continuity by maintaining assignment of an SMF (e.g., SMF 220) for ongoing sessions, support Short Message Service (SMS) delivery, support lawful intercept functionality, and/or perform other processes associated with managing user data.

Each UDR 262 may store the subscription information obtained and managed by UDM 260. For example, UDR 262 may store subscription information and subscriber profile information obtained by UDM 260. UDM 260 and UDR 262 may be referred to together herein as UDM/UDR.

As discussed above, core network 130 may be segmented. For example, as illustrated in FIG. 2, elements of core network 130 may be included in segments 1 through 3. It should be understood that core network 130 may include any number of network segments. In each case, NFs, such as NRFs 250, UDMs 260 and UDRs 262 may be distributed in each network segment.

In addition, environment 100 may include additional elements and/or NFs that are not illustrated. Such elements and/or NFs may provide security, authentication and authorization, network polices, subscriber profiles, network slicing, and/or facilitate the operation of core network 130. It should also be understood that functions described as being performed by various elements in FIG. 2, including elements in core network 130, may be performed by other elements/functions in other implementations.

Figure 3:
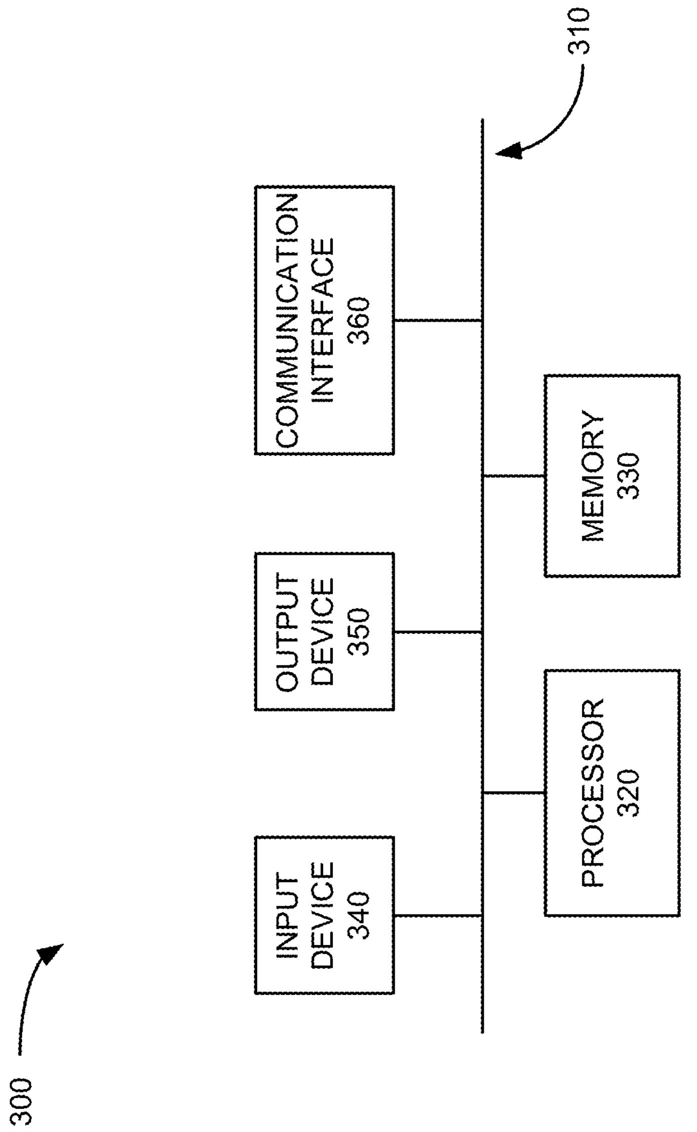
FIG. 3 illustrates logic components implemented in one or more of the devices illustrated in FIGS. 1 and 2 in accordance with an exemplary implementation.

FIG. 3 illustrates an exemplary configuration of a device 300. One or more devices 300 may correspond to or be included in devices in environment 100, such as UE device 110, wireless station 122, network devices 140, such as AMF 210, SMF 220, PCF 230, NEF 240, NRF 250, UDM 260 and UDR 262, and other devices included in environment 100. Referring to FIG. 3, device 300 may include bus 310, processor 320, memory 330, input device 340, output device 350 and communication interface 360. The exemplary configuration illustrated in FIG. 3 is provided for simplicity. It should be understood that device 300 may include more or fewer components than illustrated in FIG. 3. Bus 310 may include communication paths between the components of device 300. Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keypad, a keyboard, a mouse, a pen, a microphone, a touch screen, voice recognition and/or biometric mechanisms, etc. Output device 350 may include a mechanism that outputs information to the user, including a display (e.g., a liquid crystal display (LCD)), a speaker, etc. In some implementations, device 300 may include a touch screen display may act as both an input device 240 and an output device 350.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network.

In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
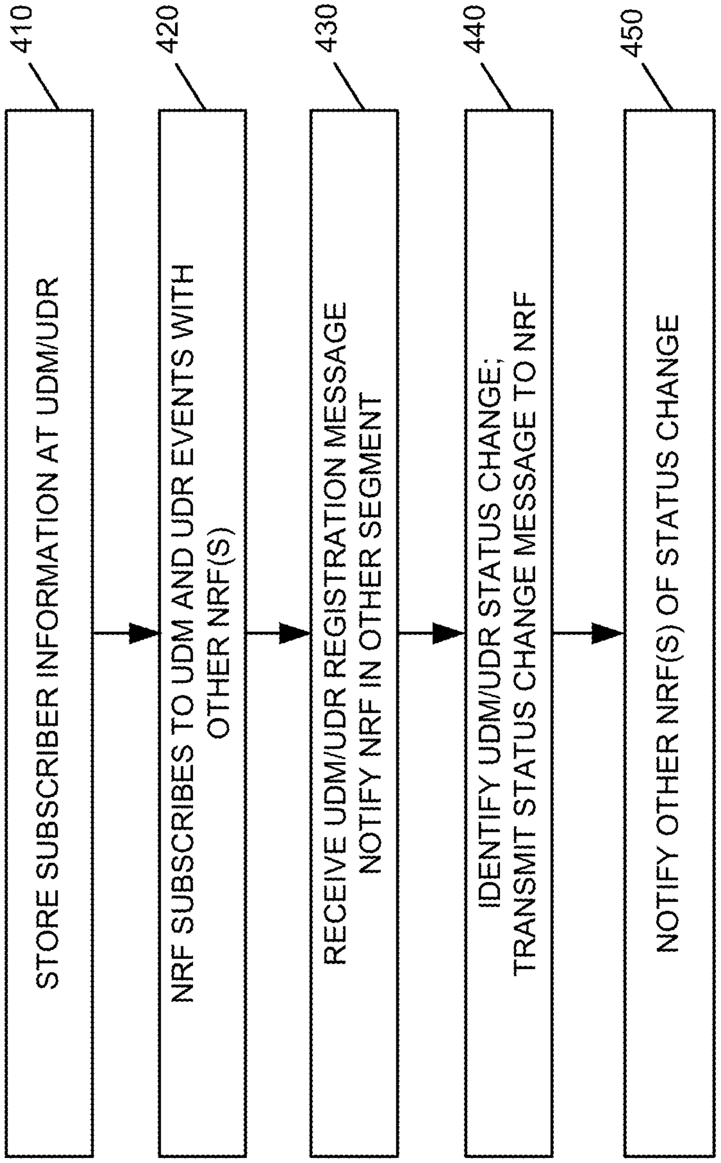
FIG. 4 is a flow diagram illustrating processing associated with network function (NF) discovery in accordance with an exemplary implementation.
Figure 5:
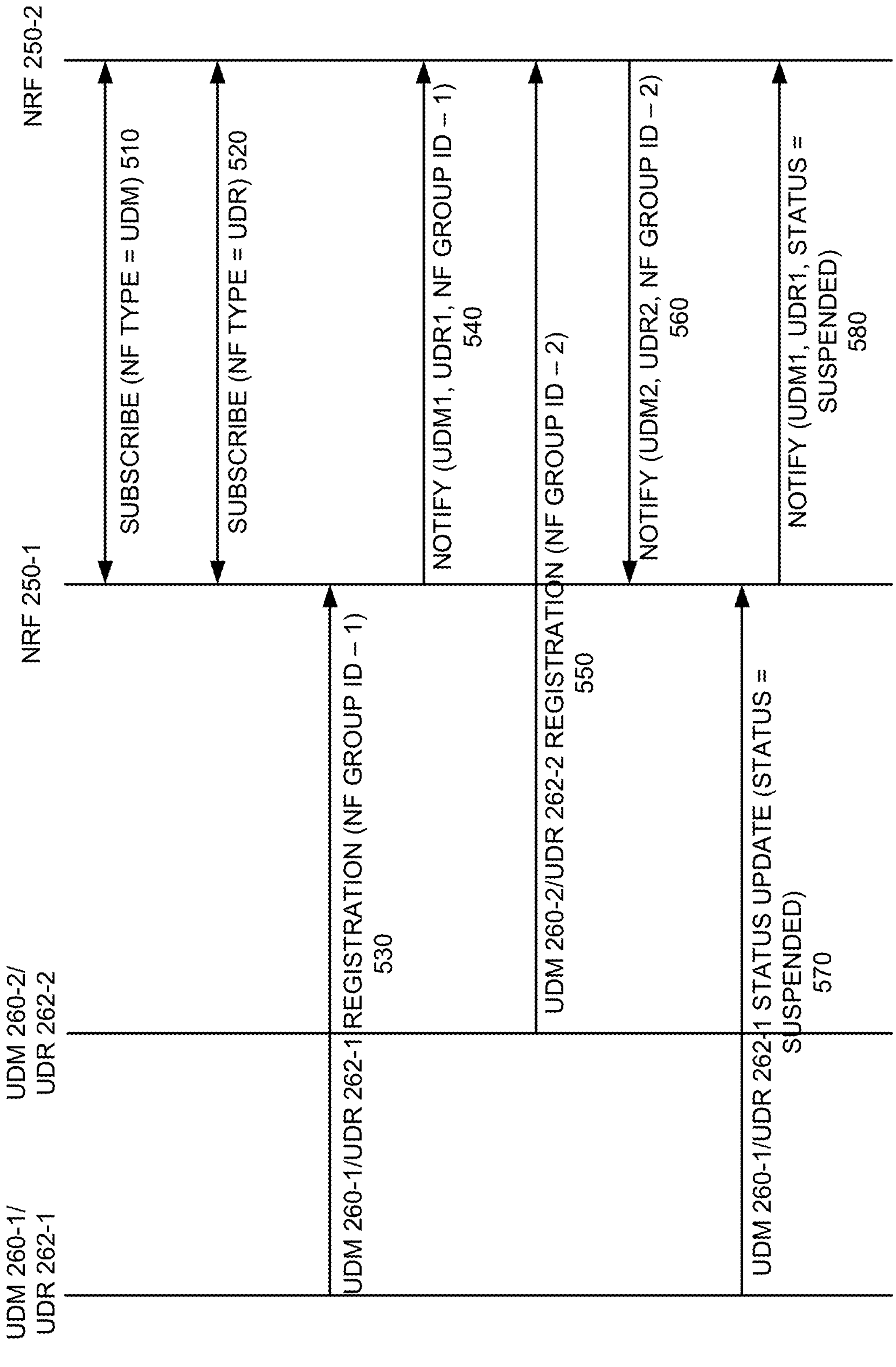
FIG. 5 is an exemplary signal flow diagrams associated with the processing of FIG. 4.

FIG. 4 is a flow diagram illustrating processing associated with NF discovery, such as inter-segment NF discovery, in environment 100 in accordance with an exemplary implementation. FIG. 5 is a signal flow diagram illustrating exemplary signal flows associated with the processing of FIG. 4. Processing may begin with storing subscriber information at UDM 260/UDR 262 (block 410). For example, user identification information, user profile and user authentication information may be stored in each of UDMs 260 and/or UDRs 262 located in each of the segments of core network 130. For example, a subscriber permanent identifier (SUPI) and/or an international mobile subscriber identity (IMSI) may be stored in one of UDMs 260/UDRs 262 for each subscriber. In addition, subscriber authentication information, subscriber profile information, such as a quality of service (QOS) and/or service level agreement (SLA) information for each subscriber may be stored in one of UDMs 260/UDRs 262.

NFs, such as AMF 210, SMF 220, PCF 230, NEF 240 and NRFs 250 often need to discover and/or obtain information stored by other NFs in core network 130. For example, various network functions may need to obtain user authentication information and/or subscriber/user profile information associated with particular subscribers identified by, for example, a SUPI, as described in more detail below. In a segmented network, such as the segmented core network 130 illustrated in FIG. 2, NFs such as AMF 210, SMF 220, PCF 230, NEF 240 and other NFs (not shown) may transmit a discovery request, such as a UDM or UDR discovery request, to an NRF 250 located physically closest to the requesting NF. The UDM or UDR discovery request may be used to obtain information to authenticate the subscriber, determine a QoS, SLA for a subscriber connection, etc. The subscriber information may be stored in a UDM 260/UDR 262 located in a different network segment than the NRF 250 that receives the discovery request, as described in more detail below.

In accordance with an exemplary implementation, an NRF 250 located in one segment of core network 130 (e.g., segment 1) may subscribe to events associated with NFs (e.g., UDMs and UDRs) located in different segments of core network (block 420). For example, when NRF 250-1 discovers that core network 130 is a segmented network, NRF 250-1 may send subscription messages, such as Subscribe (NF Type=UDM), and Subscribe (NF Type=UDR) to NRF 250-2 (FIG. 5, messages 510 and 520 directed from NRF 250-1 to NRF 250-2) to allow NRF 250-1 to receive event information associated with UDM 260-2 and UDR 262-2 in segment 2. NRF 250-2 may similarly send subscription messages to NRF 250-1 to allow NRF 250-2 to receive event information associated with UDM 260-1 and UDR 262-1 in segment 1 from NRF 250-1 (FIG. 5, messages 510 and 520 directed from NRF 250-2 to NRF 250-1).

NRF 250-2 may also subscribe to UDM/UDR events such as those received by NRF 250-3 in a similar manner. For example, NRF 250-2 may send a Subscribe message (Subscribe NF Type=UDM, Subscribe NF Type=UDR) to NRF 250-3. NRF 250-3 may similarly subscribe to UDM/UDR events associated with NRF 250-2, as well as send a subscription message to NRF 250-4, if such an NRF 250 exists in segmented core network 130.

In this manner, each NRF 250 may transmit a subscription message regarding UDM and UDR event information to neighboring NRFs 250 until all the NRFs 250 in segmented core network 130 (e.g., NRFs 250-1 through NRF 250-N, where N corresponds to the number of segments in core network 130, although only three segments are shown in FIG. 2 for simplicity) have subscribed to UDM/UDR event information in network 130. This may allow all NRFs 250 in core network 130 to receive UDM/UDR event information for UDMs/UDRs located in other segments and to be synchronized with respect to the information stored by each NRF 250.

Assume that UDM 260-1/UDR 262-1 registers with NRF 250-1 (block 430; FIG. 5, 530). The registration message from UDM 260-1/UDR 262-1 includes the Group ID (e.g., Group ID 1 in this example). Since NRF 250-2 has subscribed with NRF 250-1 with respect to event notifications regarding UDM 260-1/UDR 262-1, NRF 250-1 may send a notification message (e.g., Notify (UDM 260-1, UDR 262-1, NF Group ID-1)) to NRF 250-2 (block 430; FIG. 5, 540) indicating the UDM/UDR registration.

Further assume that UDM 260-2/UDR 262-2 registers with NRF 250-2 (FIG. 5, 550). The registration message from UDM 260/UDR 262 includes the Group ID (e.g., Group ID 2 in this example). Since NRF 250-1 has subscribed with NRF 250-2 with respect to notifications regarding UDM 260-2/UDR 262-2, NRF 250-2 may send a notification message (e.g., Notify (UDM 260-2, UDR 262-2, NF Group ID-2)) to NRF 250-1 (FIG. 5, 560). NRF 250-2 may also send a similar notification message regarding the UDM/UDR registration to NRF 250-3 in a similar manner.

In a similar manner, when NRF 250-3 receives a notification from UDM 260-3/UDR 262-3, may send a notify message regarding the UDM/UDR Registration to NRF 250-2, which would send another notification to NRF 250-1. In this manner, NRFs 250 in a segmented network may be made aware of UDM/UDR registrations in all other network segments.

NRFs 250 may also receive status change information and/or detect status changes associated with UDMs/UDRs. For example, assume that the status of UDM 260-1/UDR 262-1 changes from an active status to a suspended status or an out of service status. The status change may be based on routine maintenance (e.g., taking the UDM/UDR down), an overload condition or for some other reason. In each case, NRF 250-1 may receive a status change message, such as UDM 260-1/UDR 262-1 Status Update (Status=Suspended) from the UDM/UDR and/or detect the status change (block 440; FIG. 5, 570). In response to the status change, NRF 250-1 may notify other NRFs 250, such as NRF 250-2 of the status change (block 450). For example and as described above, since NRF 250-2 subscribes to UDM/UDR event information associated with NRF 250-1, NRF 250-1 may send a notification message to NRF 250-2 indicating that the UDM 260-1/UDR 262-1 status is suspended (FIG. 5, 580). Similarly, NRF 250-2 may transmit a notification to NRF 250-3 indicating the status change to UDM 260-1/262-1. If additional NRFs 250 exist, the status change message may be propagated to all the NRFs 250 in a similar manner. In this manner, each NRF 250 in segmented core network 130 may become aware of a UDM/UDR status change and may be synchronized with respect to UDM/UDR status.

Figure 6:
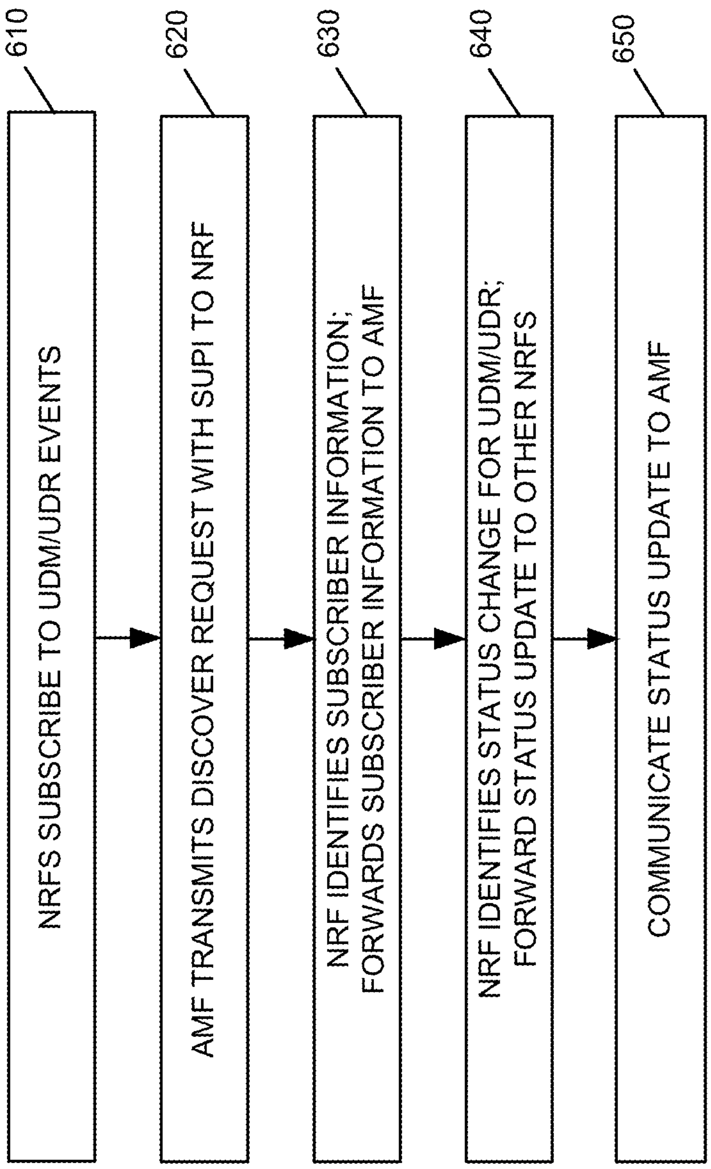
FIG. 6 is a flow diagram illustrating processing associated with NF status propagation in accordance with an exemplary implementation.
Figure 7:
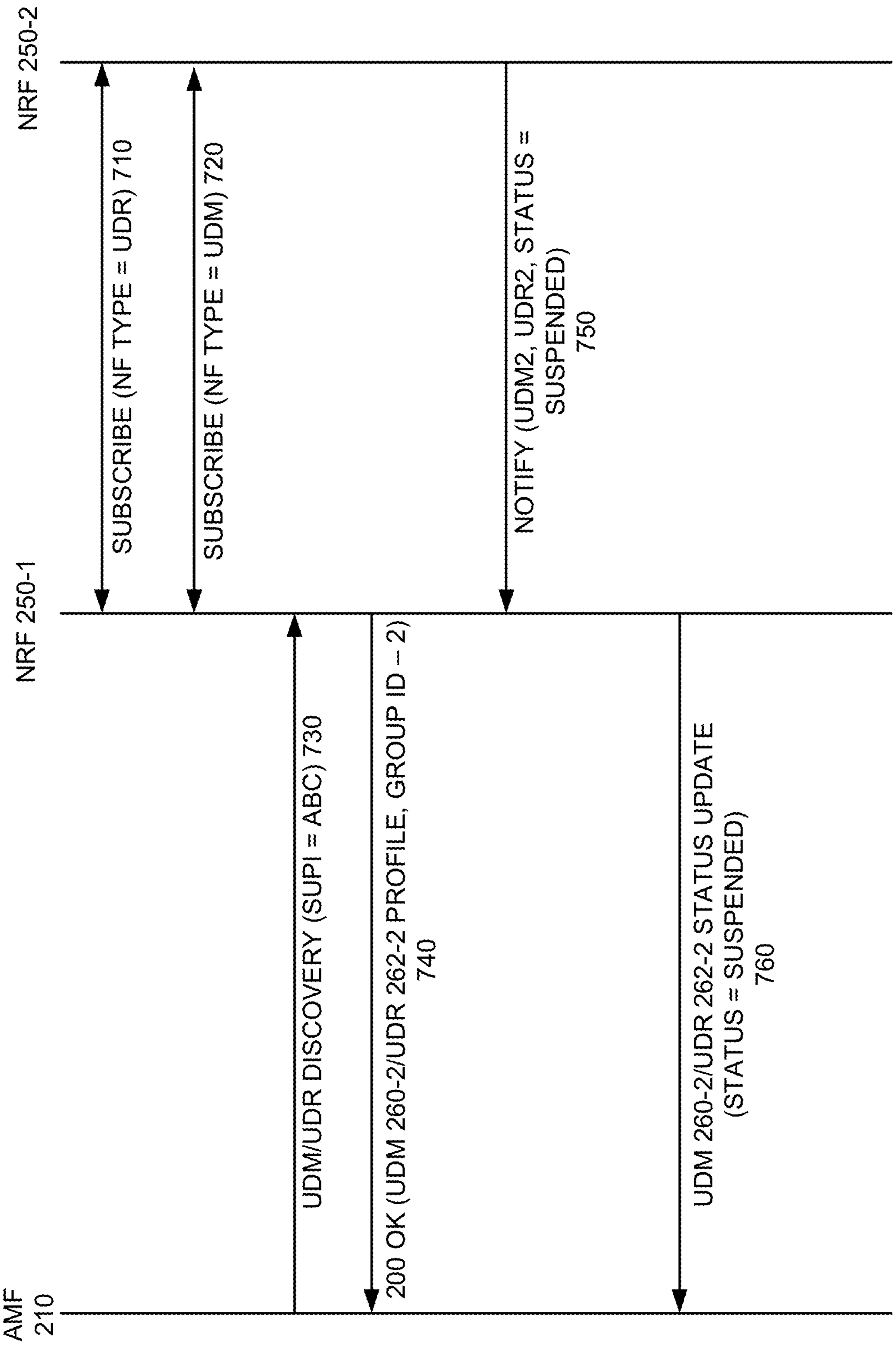
FIG. 7 is an exemplary signal flow diagrams associated with the processing of FIG. 6.

FIG. 6 is a flow diagram illustrating NF status propagation flow in environment 100 in accordance with an exemplary implementation, and FIG. 7 is a signal flow diagram illustrating exemplary signal flows associated with the processing of FIG. 6. Processing may begin with NRF 250-1 subscribing to UDM/UDR event information with NRF 250-2, and NRF 250-2 subscribing to UDM/UDR event information associated with NRF 250-1 (block 610; FIG. 7, messages 710 and 720), as described above with respect to FIGS. 4 and 5. NRF-250-2 may similarly subscribe to UDM/UDR event information associated with NRF 250-3 and vice versa, as described above.

Assume that an NF, such as AMF 210, SMF 220, PCF 230, and NEF 240, transmits a discovery request message, such as a UDM discovery message or a UDR discovery message to obtain subscriber information. For example, assume that AMF 210 transmits a UDM discovery message with a SUPI (e.g., SUPI=abc) to NRF 250-1 (block 620; FIG. 7, 730). As described previously, AMF 210 may transmit the UDM discovery message to the NRF 250 located physically closest to AMF 210. In this example, assume that NRF 250-1 located in segment 1 is the NRF 250 that is located physically closest to AMF 210.

NRF 250-1 may receive the UDM discovery message and identify the UDM/UDR associated with the SUPI of abc (block 630). For example, assume that NRF 250-1 has received event information associated with device registrations for all UDM/UDRs in core network 130. Further assume that NRF 250-1 stores information indicating that the SUPI of abc is associated with UDM group ID 2, and that NRF 250-1 stores subscriber profile information for that subscriber/user. In this case, NRF 250-1 may identify the subscriber profile information and forward a 200 OK message with the UDM/UDR subscriber profile and group ID 2 to AMF 210 (block 630; FIG. 7, 740). In this manner, NRF 250-1 may forward subscriber information stored in a UDM/UDR located in a different network segment (e.g., segment 2 in this example) without having to transmit a request message to another NRF 250 (e.g., NRF 250-2 in this example).

Further assume that UDM 260/UDR 260-2 is experiencing problems and its status has changed from an active status to a suspended status. NRF 250-2 may identify the status change and/or receive a status change update from UDM/UDR 260-2 (block 640). In response to the status change, NRF 250-2 may send a notification message to NRF 250-1 with the status update (block 640). For example, NRF 250-2 may transmit a notification message to NRF 250-1 indicating that the UDM/UDR status is the suspended status (e.g., UDM 260-2, UDR 260-2, Status Update (Status=Suspended)) (FIG. 7, 750). NRF 250-2 may also send a status update message to NRF 250-3 (not shown in FIG. 7). NRF 250-1 may then send a status update message to AMF 210 indicating that the status of UDM 260-2/UDR 262-2 has been changed to the suspended status (e.g., UDM 260-2/UDR 262-2 Status Update (Status=Suspended)) (block 650; FIG. 7, 760). In this manner, UDM/UDR status information is propagated to all NRFs 250 in segmented core network 130.

Implementations described herein provide for responding to discovery requests in a segmented network, while minimizing inter-segment traffic. For example, by subscribing to event information, such as UDM and UDR event information, an NRF may be notified of UDM and UDR information prior to the time that the information would be needed to respond to discovery requests. This enables a receiving NRF to respond to discovery requests without having to contact an NRF located in another network segment. This may allow for efficient network processing in responding to discovery requests, while minimizing latency and also reducing signaling in the network.

The foregoing description of example implementations provides illustration and description, but is not intended to be exhaustive or to limit the embodiments to the precise form disclosed. Modifications and variations are possible in light of the above teachings or may be acquired from practice of the embodiments.

For example, features have been described above with respect to NRFs subscribing to UDM and UDR event information associated with UDMs and UDRs located in other network segments. In other implementations, NRFs may subscribe to events associated with other network functions located in other segments of the network.

In addition, features have been described with respect to a segmented core network. In other implementations, similar processing may be performed in other portions of environment 100, such as in a Multi-access Edge Computing (MEC) platform located, for example, between access network 120 and core network 130.

Further, while series of acts have been described with respect to FIGS. 4 and 6 and signal flows with respect to FIGS. 5 and 7, the order of the acts and signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:

subscribing, by a first network repository function (NRF) located in a first segment of a first core network, to event information associated with at least one of a unified data management (UDM) function or a unified data repository (UDR) located in a second segment of the first core network, wherein the first core network is managed by a single telecommunications service provider and the first and second segments of the first core network are managed by the single telecommunications service provider;

receiving, by the first NRF located in the first segment of the first core network and from a second NRF located in the second segment of the first core network, at least one of UDM or UDR information associated with the at least one of the UDM function or UDR located in the second segment of the first core network;

receiving, by the second NRF, a status change indication associated with at least one of the UDM function or UDR located in the second segment of the first core network; and forwarding, by the second NRF and to the first NRF, a notification message identifying the status change.

2. The method of claim 1, wherein the status change indication corresponds to a least one of a suspended status or an out-of-service status for the at least one of the UDM function or the UDR located in the second segment of the first core network.

3. The method of claim 1, wherein the subscribing comprises:

determining, by the first NRF, that the first core network is a segmented network; and transmitting, by the first NRF and to the second NRF and in response to determining that the first core network is a segmented network, a subscribe message, wherein the subscribe message identifies at least one of the UDM function or UDR.

4. The method of claim 1, further comprising:

receiving, at the first NRF, at least one of a UDM function or UDR discovery request from a network function (NF), wherein the UDM function or UDR discovery request is associated with subscriber information stored in the UDM function or UDR located in the second segment of the first core network; and responding, by the first NRF, to the discovery request.

5. The method of claim 4, wherein the responding comprises:

transmitting, by the first NRF, information associated with a subscriber without accessing the second NRF.

6. The method of claim 1, wherein the subscribing comprises:

transmitting, by the first NRF and to the second NRF, a subscribe message, wherein the subscribe message identifies at least one of the UDM function or UDR; and receiving, by the first NRF and from the second NRF, at least one of UDM or UDR information associated with the at least one of the UDM function or UDR located in the second segment of the first core network.

7. The method of claim 6, wherein the at least one of UDM or UDR information comprises at least one of registration or status information.

8. The method of claim 1, further comprising:

receiving, at the first NRF, at least one of a UDM function or UDR discovery request from a network function (NF), wherein the UDM function or UDR discovery request is associated with subscriber information stored in the UDM function or UDR located in the second segment of the first core network, and wherein the NF comprises at least one of an access and mobility management function, a session management function, a policy control function or a network exposure function, and wherein the discovery request includes a subscriber permanent identifier.

9. The method of claim 1, further comprising:

subscribing, by NRFs located in other segments of the first core network, to UDM function or UDR event information; and propagating, by each of the NRFs located in the other segments of the first core network, the UDM function and UDR event information to other ones of the NRFs.

10. The method of claim 1, further comprising:

transmitting, by a first network function, a discovery request including a subscriber permanent identifier (SUPI) to the first NRF, wherein the first NRF is an NRF that is located physically closest to the first network function as compared to other NRFs, and the SUPI is associated with subscriber information stored in the second segment of the first core network.

11. A system, comprising:

a first network repository function (NRF) located in a first segment of a first core network, wherein the first NRF includes at least a first processor;

a second NRF located in a second segment of the first core network, wherein the second NRF includes at least a second processor, and wherein the first core network is managed by a single telecommunications service provider and the first and second segments of the first core network are managed by the single telecommunications service provider; and at least one of a unified data management (UDM) function or a unified data repository (UDR) located in each of the first segment and second segment of the first core network, wherein the first NRF is configured to:

subscribe to event information associated with at least one of a unified data management (UDM) function or a unified data repository (UDR) located in a second segment of the first core network, and receive, from the second NRF, at least one of UDM or UDR information associated with the at least one of the UDM function or UDR located in the second segment of the first core network, and wherein the second NRF is configured to:

receive a status change indication associated with at least one of the UDM function or UDR located in the second segment of the first core network, and forward, to the first NRF, a notification message identifying the status change.

12. The system of claim 11, wherein the status change indication corresponds to a least one of a suspended status or an out-of-service status for the at least one of the UDM function or the UDR located in the second segment of the first core network.

13. The system of claim 11, wherein when subscribing, the first NRF is configured to:

determine that the first core network is a segmented network, and transmit, to the second NRF, and in response to determining that the first core network is a segmented network, a subscribe message, wherein the subscribe message identifies at least one of the UDM function or UDR.

14. The system of claim 11, wherein the first NRF is further configured to:

receive at least one of a UDM function or UDR discovery request from a network function (NF), wherein the UDM function or UDR discovery request is associated with subscriber information stored in the UDM function or UDR located in the second segment of the first core network, and respond to the discovery request without accessing the second NRF.

15. The system of claim 11, wherein when receiving at least one of UDM function or UDR information, the first NRF is configured to:

receive, from the second NRF at least one of UDM or UDR registration or status information.

16. The system of claim 11, further comprising:

a first network function configured to:

transmit a discovery request including a subscriber permanent identifier (SUPI) to the first NRF, wherein the first NRF is an NRF that is located physically closest to the first network function as compared to other NRFs, and the SUPI is associated with subscriber information stored in the second segment of the first core network.

17. A non-transitory computer-readable medium having stored thereon sequences of instructions which, when executed by at least one processor associated with a network repository function (NRF) located in a first segment of a first core network, cause the at least one processor to:

subscribe to event information associated with a first network function (NF) located in a second segment of the first core network;

receive, from a second NRF located in the second segment of the first core network, at least one of unified data management (UDM) function or unified data repository (UDR) information associated with the at least one of a UDM function or a UDR located in the second segment of the first core network, wherein the first core network is managed by a single telecommunications service provider and the first and second segments of the first core network are managed by the single telecommunications service provider; and receive, from the second NRF, a status change message associated with at least one of the UDM function or UDR located in the second segment of the first core network.

18. The non-transitory computer-readable medium of claim 17, wherein the status change message indicates at least one of a suspended status or an out-of-service status for the at least one of the UDM function or UDR located in the second segment of the first core network.

19. The non-transitory computer-readable medium of claim 17, wherein the instructions further cause the processor to:

determine that the first core network is a segmented network; and transmit, to the second NRF, and in response to determining that the first core network is a segmented network, a subscribe message, wherein the subscribe message identifies at least one of the UDM function or UDR.

20. The non-transitory computer-readable medium of claim 17, wherein the instructions further cause the at least one processor to:

receive a registration message from at least one of the UDM function or UDR located in the first segment of the first core network; and forward, to the second NRF, a notification message identifying the UDM function or UDR located in the first segment of the first core network.

* * * * *